United States Patent [19]
Henoch

[11] Patent Number: 5,251,235
[45] Date of Patent: Oct. 5, 1993

[54] SINGLE RECEIVER FOR RECEIVING WIRELESS TRANSMISSION OF SIGNALS IS FOR USE WITH A SERIAL TWO-CONDUCTOR DATA BUS

[76] Inventor: Bengt Henoch, Backvindelin 90, S-126 57 Hägersten, Sweden

[21] Appl. No.: 764,124

[22] Filed: Sep. 24, 1991

Related U.S. Application Data

[63] Continuation of Ser. No. 460,870, Feb. 8, 1990, abandoned.

[30] Foreign Application Priority Data

Jun. 14, 1988 [SE] Sweden ............................ 8802230

[51] Int. Cl.[5] .................................. H04L 7/06
[52] U.S. Cl. ........................... 375/37; 375/113
[58] Field of Search ............... 375/17, 20, 21, 22, 375/106, 111, 113; 360/51; 379/55; 455/41; 370/78, 100.1; 381/79

[56] References Cited

U.S. PATENT DOCUMENTS

| | | | |
|---|---|---|---|
| 2,837,719 | 6/1958 | Albanese | 375/20 |
| 2,912,684 | 11/1959 | Steele | 375/20 |
| 2,921,981 | 1/1960 | Kidd | 370/78 |
| 3,013,147 | 12/1961 | Guerth | 370/78 |
| 3,390,232 | 6/1968 | Jager et al. | 375/113 |
| 3,601,537 | 8/1971 | Gueldenpfenning et al. | 375/113 |
| 3,688,036 | 8/1972 | Bland | 375/20 |
| 3,711,651 | 1/1973 | Connell | 370/78 |
| 4,306,308 | 12/1981 | Nossen | 375/113 |
| 4,398,178 | 8/1983 | Russ et al. | 340/310 A |
| 4,569,045 | 2/1986 | Schieble et al. | 370/85.1 |
| 4,613,974 | 9/1986 | Vokac et al. | 375/37 |
| 4,742,470 | 5/1988 | Juengel | 375/113 |
| 4,876,697 | 10/1989 | Whitfield | 375/20 |

Primary Examiner—Benedict V. Safourek
Attorney, Agent, or Firm—Nies, Kurz, Bergert & Tamburro

[57] ABSTRACT

An arrangement for wireless transmission of signals using a serial two-conductor data bus, the arrangement including a clock conductor and a data conductor connected to a transmitter, a receiver and a demodulator, the transmitter including an oscillator, and further including a modulator which effects modulating the oscillator generated signal in dependence on the clock conductor signal and the data conductor signal respectively. The modulator (3) is operative in carrying out on the oscillator generated signal two significant, separate modulation steps which do not coincide in time, thereby to form two mutually independent signal channels (4,8;5,10), of which a first channel (4,8) is intended for data signals and the other channel (5,10) is intended for the clock signals. The demodulator (6) is operative in demodulating one thus modulated signal received by the receiver (2) and in recreating the aforementioned two signals, and also in that the demodulator has an output (9) for a clock conductor and an output (7) for a data conductor.

10 Claims, 5 Drawing Sheets

Fig. 6a — MOD. POS.
Fig. 6b — MOD. NEG.

SINGLE RECEIVER FOR RECEIVING WIRELESS TRANSMISSION OF SIGNALS IS FOR USE WITH A SERIAL TWO-CONDUCTOR DATA BUS

This application is a continuation of application Ser. No. 460,870, filed Feb. 8, 1990 and now abandoned.

The present invention relates to an arrangement for the wireless or non-physical transmission of signals via a serial two-conductor data bus.

Various kinds of serial data buses are known to the art. Such buses are used to transmit data and data instructions between the different units of a computer system. A serial data bus has certain advantages in relation to a parallel data bus, such as simpler conductor layouts, smaller capsules with fewer legs for different units, etc.

A serial data bus is normally constructed around two conductors or conductor pairs, of which one is intended for data and the other for a clock signal.

The clock signal on the clock conductor constitutes a system clock which is common to all the units connected to the serial bus and is transmitted from that unit which is the "master" unit of the serial bus at that moment in time, all other units at that time being "slaves". Data and clock are synchronized, for instance so that the data conductor will shift value only when the clock is low. Furthermore, the sequence in which the data and clock conductors are activated from a rest state, e.g. a high state, can be used to signify the commencement and termination of a data message.

The unit which is "master" of the data bus controls subordinated "slaves", by sending queries and collecting answers on the data conductor, e.g. by reading from and writing into a memory facility connected to the bus.

In the case of some applications, there exists a need for wireless connection between a slave unit and the serial bus.

This need may be due to avoid the use of unreliable mechanical contacts, or when the slave unit shall only be in the close proximity of a bus contact device on particular occasions, or when wishing to obtain a given air gap between the respective electrical contact devices of the slave unit and the bus.

Examples of such applications include electronic cash dispensers, autobanks, credit card machines, electronic keys, the marking and labelling of tools and small components, details, and the external contact with a vehicle mounted travel computer.

One problem encountered with the wireless transmission of signals via a serial two-conductor data bus in accordance with known techniques is that two transmission devices are required, one for each conductor. Another problem resides in the provision of a transmission device which is small, of simple construction and inexpensive.

The present invention solves these problems and provides an arrangement which can be given very small dimensions and which is both simple and inexpensive.

An essential feature of the inventive arrangement is that it utilizes solely one wireless or non-physical transmission device, e.g. an inductive circuit, for transmitting both clock signals and data signals.

Furthermore, the invention enables signals to be transmitted via the serial data bus in a non-distorted state, and hence no additional interface is required to create synchronous relationships between data and clock signals.

The present invention thus relates to an arrangement for the wireless transmission of signals via a serial two-conductor data bus which comprises a clock pulse conductor and a data signal conductor connected to a transmitter, a receiver and a demodulator, said transmitter including an oscillator, and which further comprises a modulator operative to modulate the signal produced by the oscillator in dependence on the signal on the clock conductor or data conductor, and is characterised in that the modulator is constructed to carry out on the signal generated by the oscillator two significant, separate modulating steps or processes which do not coincide in time, thereby to produce two mutually independent signal channels, of which a first is intended for data and the other for said clock; in that the demodulator is constructed to demodulate one thus modulated signal received by the receiver and to recreate said two signals; and in that said demodulator has a clock conductor output and a data conductor output.

The invention will now be described in more detail with reference to exemplifying embodiments thereof illustrated in the accompanying drawings, in which

FIGS. 6aI, 6aII and 6aIII illustrates signals at different points in the circuit shown in FIG. 2 in the case of three modulation methods alternative to the first modulation method, FIGS. 6bI, 6bII and 6bIII illustrates signals at different points in the circuit shown in FIG. 2 in the case of three modulation methods alternative to the second modulation method;

Figure 1A:
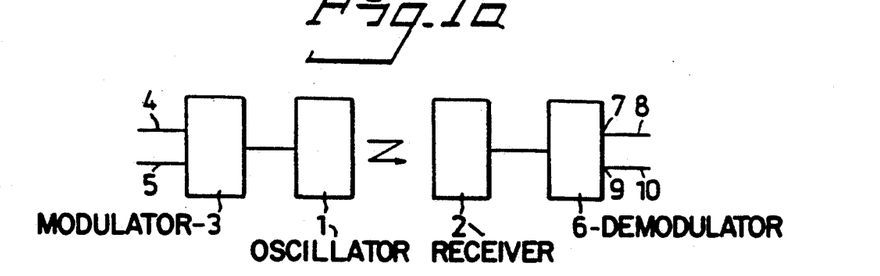
FIG. 1a is a block schematic illustrating the construction principles of the inventive arrangement.

FIG. 1a is a block schematic illustrating a serial two-conductor data bus which has located on the "master"-side a transmitter which includes an oscillator 1 and which is intended to effect wireless or non-physical transmission of a signal to a receiver 2 on the "slave"-side. The transmitter includes a modulator 3 having connected thereto a clock conductor 4 and a data conductor 5 belonging to the serial bus.

The modulator is constructed to modulate the signal produced by the oscillator, said modulated signal being transmitted.

The receiver 2 is constructed to apply the received signal to a demodulator 6, which has an output 7 for the clock bus clock conductor 8 and an output 9 for the bus data conductor 10. The demodulator 6 is constructed to recreate or reconstruct the contents of the signals on the clock conductor 4 and the data conductor 5 respectively.

Figure 1B:
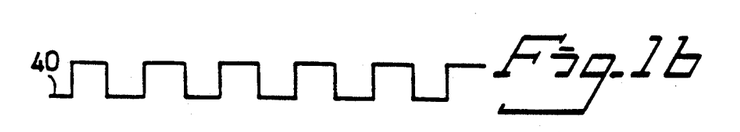
FIGS. 1b and 1c show signals occurrent in a serial data bus.
Figure 1C:
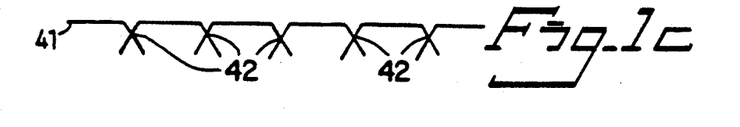

FIGS. 1b and 1c illustrates two signals, of which the signal 40 is the clock signal, i.e. the signal present on the conductor 5. The signal 41 is the data signal, i.e. the signal present on the conductor 5. A characteristic feature of a serial data bus is that the data signals 42, which are illustrated with a cross in the signal curve 41, comprise a positive and a negative flank, or vice versa, which do not coincide with a positive or negative flank of the clock signal.

Thus, in the case of a serial data bus of the kind meant here, the clock signal and the data signal are mutually synchronized in time.

In accordance with the invention, the modulator 3 is constructed to execute on the signal produced by the oscillator two significant, separate modulation steps which do not coincide in time, therewith to form two mutually independent signal channels, of which a first channel 4,8 is intended for data and the other channel 5,10 is intended as a clock. The demodulator 6 is constructed to demodulate a modulated signal received by the receiver 2 and to recreate the two modulator input signals 4, 5 as output signals 8 and 10 respectively.

As will be apparent from the following, the present invention enables signals to be transmitted on two mutually independent channels, one for data and one for the clock, with the aid of solely a single wireless or non-physical transmission device.

According to a first preferred embodiment, the frequency generated in the oscillator 1 can be compared with the data speed applied, and is therewith in the order of kHz.

Figure 2:
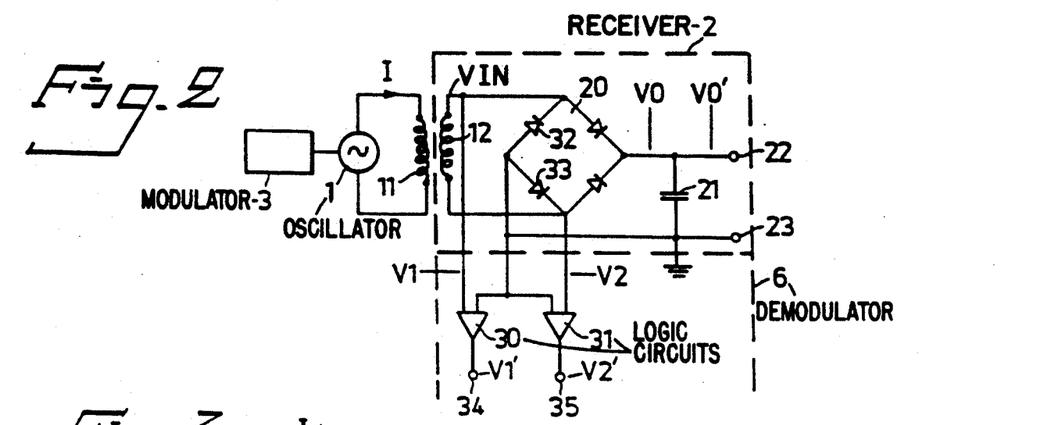
FIG. 2 is a more detailed illustration of a first part of a first embodiment of the inventive arrangement.

According to one preferred embodiment, the aforesaid wireless transmission is effected with the aid of an inductive transmission device, in which both the transmitter and the receiver include a coil 11,12, see FIG. 2.

Figure 3A:
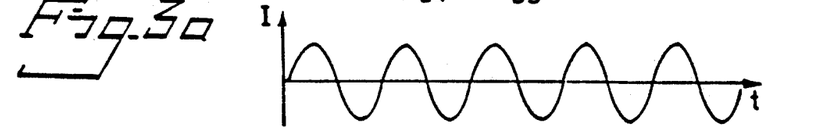
FIGS. 3a-3h illustrate signals at different points in the circuit shown in FIG. 2.

FIG. 2 illustrates schematically a first embodiment of an inventive arrangement in which the oscillator I drives an alternating current I through the transmitter coil 11, see FIG. 3a, said alternating current being, for instance, sinusoidal. An alternating voltage VIN is generated inductively in the receiver coil 12, see FIG. 3b. The receiver 2 includes a rectifying bridge 20 and a smoothing capacitor 21, whereby a d.c. voltage VO', occurs between the poles 22,23, see FIG. 3d.

Figures 3B, 3C:
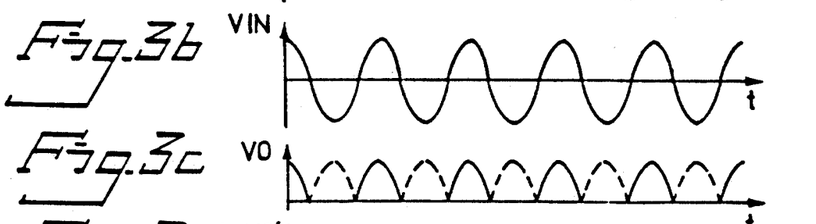
Figure 3D:
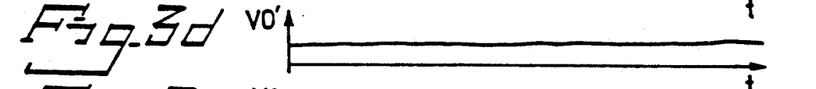

FIG. 3c illustrates the voltage at the point VO in relation to earth, the previously negative half cycles being shown in broken lines for the sake of clarity.

Figure 3E:
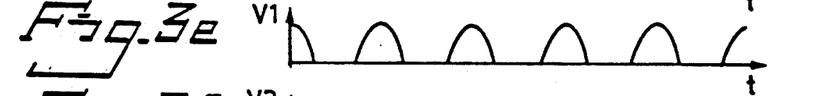
Figures 3F, 3G, 3H:
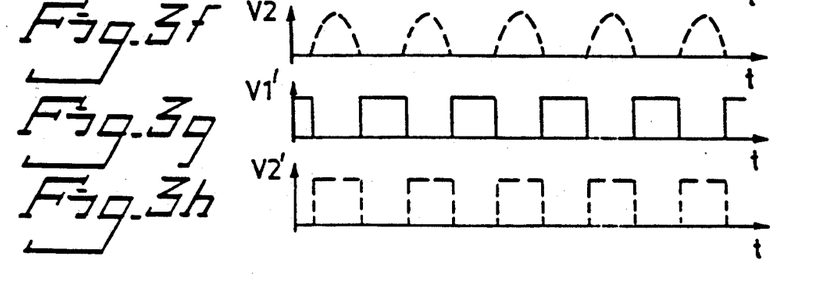

The demodulator 6 includes two logic circuits 30,31, of which a first circuit 30 is connected across a diode 32 in the rectifying bridge 20, such as to take out the positive half cycles, of the received signal, see FIG. 3e, and of which the other circuit 31 is connected across a diode 33 in the rectifying bridge such as to take out the negative half cycles, see FIG. 3f. The logic circuits 30,31 are constructed so as to produce on their respective outputs 34,35 a pulse train which corresponds to the positive and negative half cycles respectively, see FIGS. 3g and 3h respectively. The logic circuits 30,31 are preferably operational amplifiers which have a speed sufficient to convert a sinus signal of oscillator frequency f to a pulse train of repetition frequency f.

In addition to the direct voltage VO', the arrangement hitherto described will thus provide a first channel 34 for positive half cycles and a second channel 35 for negative half cycles.

In accordance with the invention, these two channels are utilized to form two mutually independent signal channels, one for data and one for clock. As before mentioned, the modulator 3 is constructed to carry out two significant, separate modulation steps. In this respect, the modulator 3 is constructed to effect the two respective modulation steps on two significant different respective parts of the signal produced by the oscillator.

More specifically, the modulator 3 is constructed to create said first channel 4,8;34, by executing a modulation step in which solely the d.c. voltage positive half cycles produced by the oscillator are modulated, and to create said second channel 5,10;35 by executing a modulation step in which solely the d.c. signal negative half cycles produced by the oscillator are modulated.

FIGS. 4a-4d and FIGS. 5a-5d illustrate principle signals I, VIN, V1' and V2' according to FIG. 2. FIGS. 4a-4d relate to the modulation of positive half cycles of the oscillator signal I (MOD.POS.) and FIGS. 5a-5d relate to the modulation of negative half cycles (MOD.-NEG.).

As will be seen from FIGS. 4a and 5a, the modulator 3 has modulated the sinusoidal oscillator signal I so that the current I is constant where a centre half cycle in FIGS. 4a, 5a should have been varied.

These modulations give rise to a voltage VIN across tile receiver coil 12, as illustrated in FIGS. 4b and 5b respectively. FIGS. 4c, 4d and 5c, 5d illustrate respectively the pulse train obtained at points 34 and 35 respectively, i.e. V1' and V2' respectively in FIG. 2.

FIGS. 4a and 5a illustrate a modulation step in which a full half cycle is replaced with a constant level of current strength, so to say.

Figure 6A:
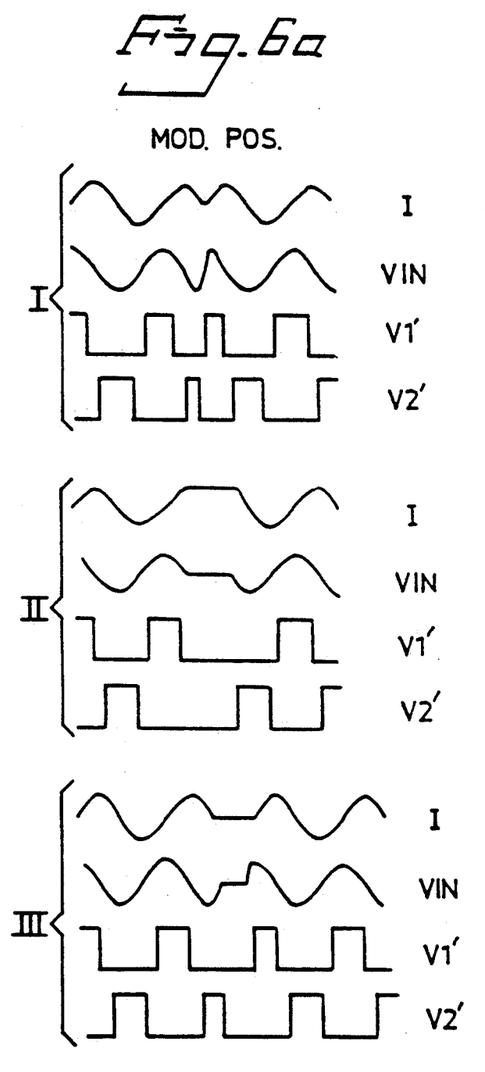
Figure 6B:
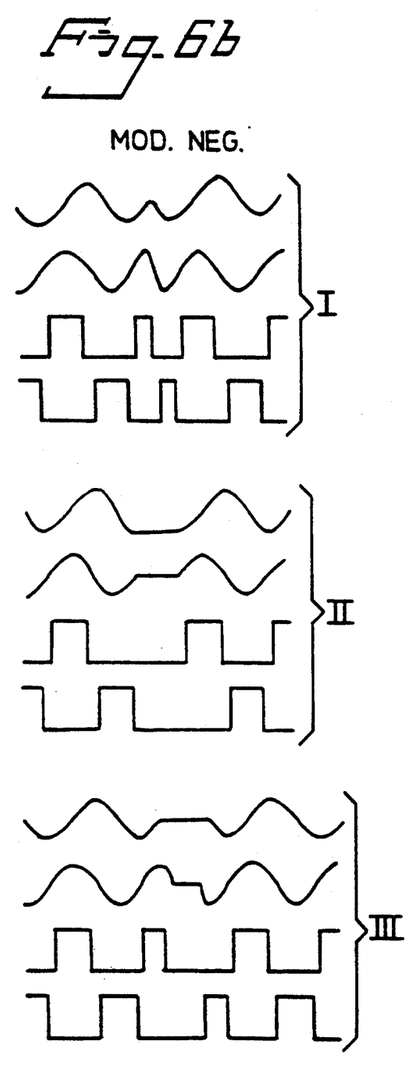

Seen from top to bottom, each of FIGS. 6a and 6b illustrate three different modulation forms of I and the voltages VIN, V1' and V2' resulting from these modulations. FIG. 6a also illustrates modulation of positive half cycles. In a corresponding manner, FIGS. 6b illustrate three different modulation forms of negative half cycles and the voltages VIN, V1' and V2' resulting from these modulations.

Figure 4:
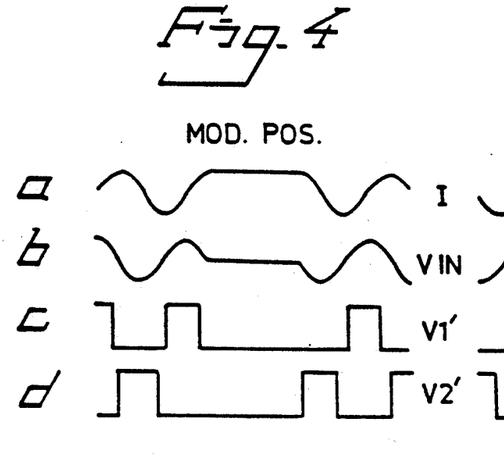
FIGS. 4a-4d illustrate signals at different points in the circuit shown in FIG. 2 in the case of a first modulation method.
Figure 5:
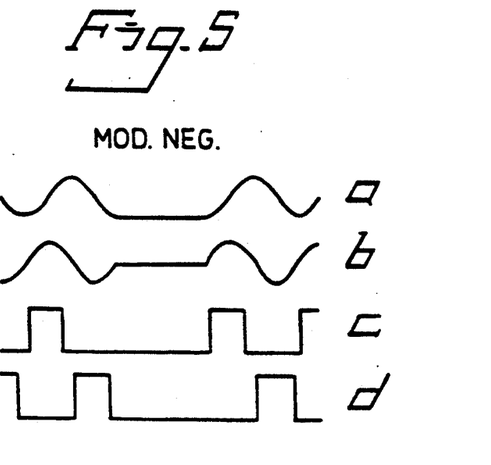
FIGS. 5a-5d illustrate signals at different points in in the circuit shown in FIG. 2 in the case of a second modulation method.

According to one preferred embodiment of the invention, the modulator 3 is constructed to modulate the half cycles so that in the signal transmitted by the transmitter the amplitude of a modulated half cycle is constant during a part of the half cycle or during the whole of said half cycle, as illustrated in FIGS. 4, 5 and 6.

FIG. 2 shows only a part of what can be referred to as the demodulator 6. The demodulator 6 namely also includes circuits for separating modulated positive half cycles and modulated negative half cycles respectively.

It will be seen from the examples illustrated in FIGS. 4, 5 and 6 that the different modulation forms give rise to pulse trains in the channels 34 (V1') and 35 (V2') which are characteristic with respect to pulse position and pulse width.

In the following, the modulation form illustrated in FIGS. 4a–4d and 5a–5d is taken as an example to describe that two mutually independent signal channels are formed, namely one channel for data and one channel for the clock.

Figure 7:
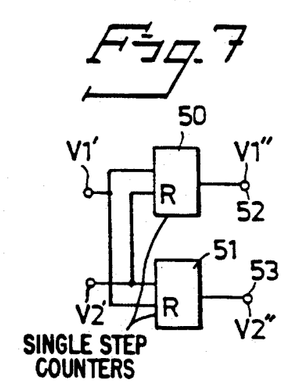
FIG. 7 is a block schematic of a second part of the inventive arrangement according to said first embodiment.
Figures 8A, 9A:
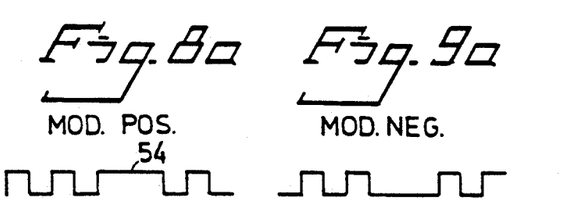
FIGS. 8a, 8b, 9a and 9b illustrates signals at different points in the circuit shown in FIG. 7.
Figure 8B:
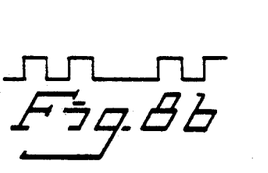
Figure 9B:
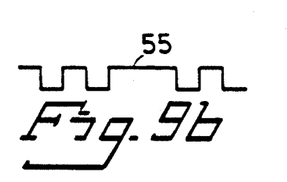

According to one preferred embodiment of the invention, the respective outputs 34,35 of the logic circuits 30,31 are connected to two so-called single-step counters 50,51 or corresponding known circuits, see FIG. 7, in a manner such that there is obtained a characteristic signal on the output 52 of the first counter 50 when a positive half cycle of the current I has been modulated by means of the modulator, and such that a characteristic signal is obtained on the output 53 of the second counter 51, when a negative half cycle has been modulated.

As illustrated in FIG. 7, the points 34 and 35 (V1' and V2') are entered into the two counters, where the one channel provides a so-called reset (R) signal.

So-called latch circuits, such as RS-latch 4013 with complementary output, can be used instead of single-step counters.

As illustrated in FIGS. 8a, 8b and 9a, 9b the output 52 produces a signal V1" (across the left-hand curve) with a long pulse 54 when modulating a positive half cycle, whereas the output 53 produces a signal V2" (lower right-hand curve), which presents a long pulse 55 for modulation of a negative half cycle.

Figure 10:
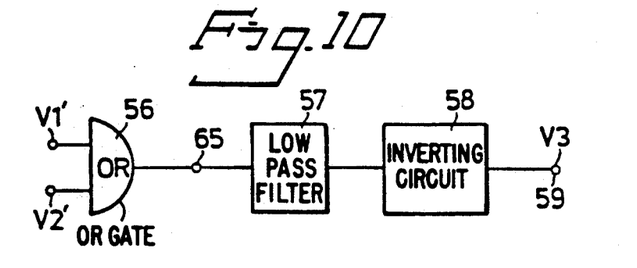
FIG. 10 illustrates a third part of the inventive arrangement according to said first embodiment.

The respective outputs of the logic circuit 30, 31 (FIG. 2) are connected to a trigger circuit which includes an OR-gate 56, see FIG. 10, a low-pass filter 57 and an inverting circuit 58. The output 59 (V3) of the trigger circuit is connected to two so-called latch circuits 60,61, see FIG. 13, of which the one, input 62, of the latch circuit 60 is connected to the output 52 (V1") from said first single-step counter 50 (FIG. 7), and where the second, input 63, of the latch circuit 61 is connected to the output 53 (V2") from the other single-step counter 51.

Figure 11:
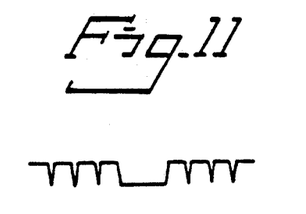
FIGS. 11 and 12 illustrate signals at different points in the circuit shown in FIG. 10.
Figure 12:
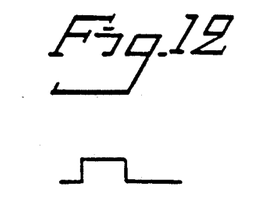

The output 65 from the OR-gate 56 has the signal illustrated in FIG. 11 in the event of the modulation of a positive or negative half cycle. Subsequent to passing through the low-pass filter and being inverted, the signal V3 on the output 59 will have the appearance illustrated in FIG. 12, i.e. a long pulse. The positive pulse flank is used to guide data collection from the input 62 and 63, see FIG. 13.

The latch circuit 60,61 which are triggered with the signal V3, are constructed so that their respective outputs 66,67 will shift values when both respective inputs 62,63 are high and a positive flank of the trigger pulse V3 (see FIG. 12) from the trigger circuit prevails.

Figures 13, 14A, 14B, 15, 16, 17:
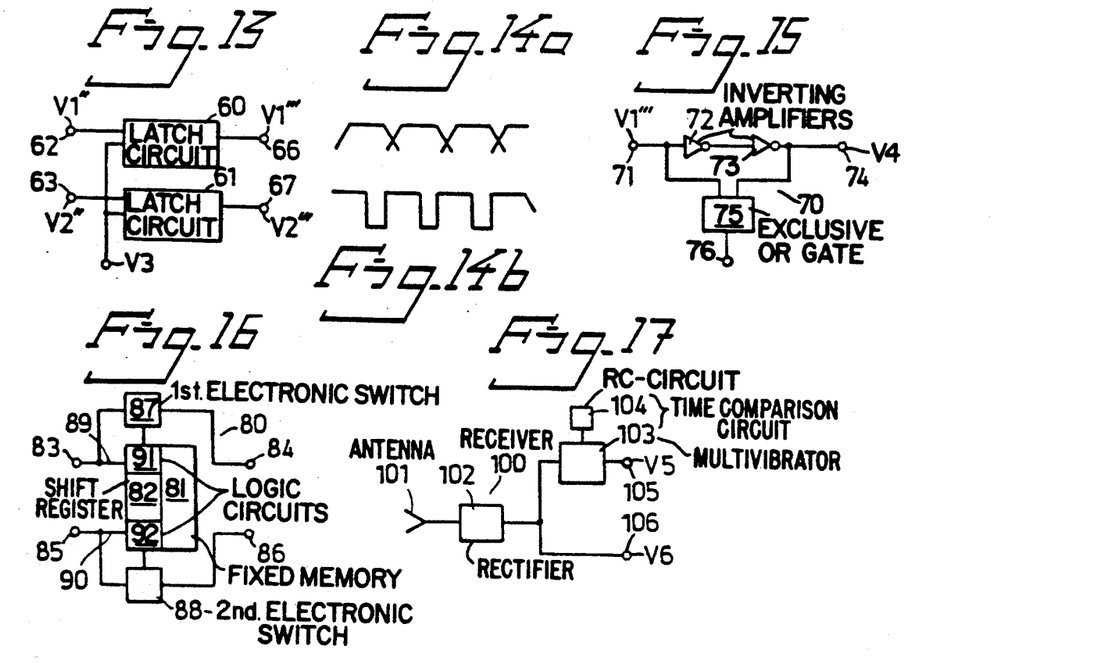
FIG. 13 illustrates a fourth part of the inventive arrangement according to said first embodiment.
FIGS. 14a and 14b illustrates signals at different points in the circuit shown in FIG. 13.
FIG. 15 illustrates schematically a circuit for transmitting data in a direction opposite to that described with reference to FIGS. 1-14.
FIG. 16 illustrates a code key circuit.
FIG. 17 illustrates a part of a receiver and demodulator according to a second embodiment of the invention.

The outputs 66,67 represent two mutually independent signal channels, illustrated in FIG. 14, namely one channel 66 for data and one channel 67 for the clock. These outputs 66,67 can be connected to a serial, two-conductor data bus or to a component adapted thereto.

It is thus clear that the data signal-4 has been recreated at the output 66, which corresponds to the output 7 of the FIB. 1 embodiment, and that the clock signal has been recreated at the output 67, which corresponds to the output 9 of the FIG. 1 embodiment. Thus, the signals V1''' and V12''' are present in two mutually independent signal channels.

The signal channel 4,8 intended for data shall also enable data to be transmitted back from the "slave" side to the "master" side.

This is achieved in accordance with one preferred embodiment of the invention, by connecting a circuit 70 to the output, 66 (V1''') as illustrated in FIGS. 13 and 15. The output 66 of FIG. 13 connected to the input 71 of FIG. 15. The circuit 70 includes two series-connected inverters 72,73 and an output 74. Connected in parallel across the inverter 72,73 is an exclusive-OR-gate 75 having an output 76.

When data is transmitted from the "master" side 1,3 to the "slave" side 2,6, V4 is dependent on V1''' and therewith equal, and hence the output 76 from the exclusive-OR-gate 75 is constantly zero.

When data is to be transmitted from the "slave" side to the "master" side, a signal V4 is applied on the output 74. In this instance no data is transmitted from the "master" side, and hence V1''' will lie constantly on one, for instance. The output 76 on the gate 75 will then vary with the applied V4 and this signal is used to control the receiver 2, in accordance with a suitable known method, to effect transmission to the "master" side.

For instance, the signal on the output 76 can be used to change the impedance of the receiver coil 12, by short circuiting the receiver coil 12 or by activating and deactivating a connected impedance. Such an impedance change can be detected as changes in the current strength in the transmitter coil 12, with the aid of suitable known circuits, and filtered out to a data signal in the data channel 4.

Although not shown, the signal on the output 76 can be used alternatively to control means for retransmitting a signal which is a harmonic or subharmonic of the frequency generated by the oscillator 1, or can be used to control a separate oscillator connected across the coil 12.

An overtone, or harmonic, can be created by disturbing the balance in the rectifying bridge.

When retransmissing data from the "slave" side there is utilized an interruption in transmission through the data conductor on the "master" side, which results in a time gap in which the "slave" side can send a data bit.

The modulation principle characteristic of the first embodiment of the invention, namely the modulation of positive and negative half cycles in a transmitted signal, implies that in the case of certain wireless or non-physical transmission devices rotation of the transmission device through 180° will result in reversal of the signal channels. This can be resolved by transmitting a predetermined number of modulation cycles in a given one of said channels when establishing communication, wherein the corresponding signal channel on the "slave" side, which detects the modulation cycles via a circuit of some suitable known kind, is connected to the correct data bus conductor.

In the case of the first embodiment, there are utilized modulations which do not coincide in time.

The fact that the modulations do not coincide in time, but occur at mutually different times, does not constitute a limitation in a two-conductor serial data bus, since in the case of a data bus of this kind the data signal and the clock signal are mutually synchronized so that a switch from a low to a high signal, and vice versa, in the one channel will never occur at the same time as a switch in the other channel.

This fact is also utilized in a second embodiment of the invention, described here below.

According to this second embodiment, there is used a carrier wave, which is modulated. The frequency of the carrier wave may be high, or very high, in relation to the data speed and the carrier wave can be transmitted by means of an antenna or aerial on the "master" side and "slave" side respectively.

By high carrier wave frequency is meant a frequency which is so high that the carrier wave will pass through many cycles even in the case of the shortest modulation pulse, such that the rise and fall times of the pulse will not be influenced significantly by the frequency of the carrier wave.

Referring to FIG. 1, the modulator 3 of the second embodiment is constructed to modulate a carrier wave generated by the oscillator 1 and to carry out two respective modulation steps thereon.

According to the second embodiment, the modulator 3 is constructed to carry out said two respective modulation steps such that in a first modulation step the carrier wave is transmitted over a predetermined short time period, and such that in the second modulation step the carrier wave is transmitted for a predetermined long time period, of which time periods said short time period is significantly shorter than a given predetermined reference time period, and in which said long time period is significantly longer than said reference time period.

In this respect, the modulator is constructed to transmit the carrier wave over the shorter time period when the data conductor 4 switches from a high to a low signal, and vice versa, or when marking the signal level, and is constructed to effect modulation during the longer time-period when a switch or marking occurs in the clock conductor 5.

FIG. 17 illustrates schematically a receiver 100, which includes an antenna 101 and a rectifier 102, which Includes a detector diode, said rectifier being intended to rectify the received carrier wave and therewith reproduce the modulation signal to the modulator 3.

The demodulator includes a time comparison circuit 103,104 which triggers off positive flanks in the received signal and has a so-called hold-time which is significantly long in relation to short data pulses, and which is significantly short in relation to long data pulses. A hold-time is thus said reference time.

In the case of one embodiment of the invention, the time comparison circuit comprises a monostable multivibrator which is connected in a non-feedback mode, i.e. the hold-time is determined by an RC-circuit 104 connected to the multivibrator and defining a reference time. The multivibrator may, for instance, be an HCC/HCF 4538. When a pulse train is applied to the input, the monostable multivibrator 103 is operative, together with the RC-circuit, in giving each positive flank on the output a pulse having a duration which is equal to said hold-time or reference-time, as illustrated in FIG. 18.

Figures 18, 19, 20:
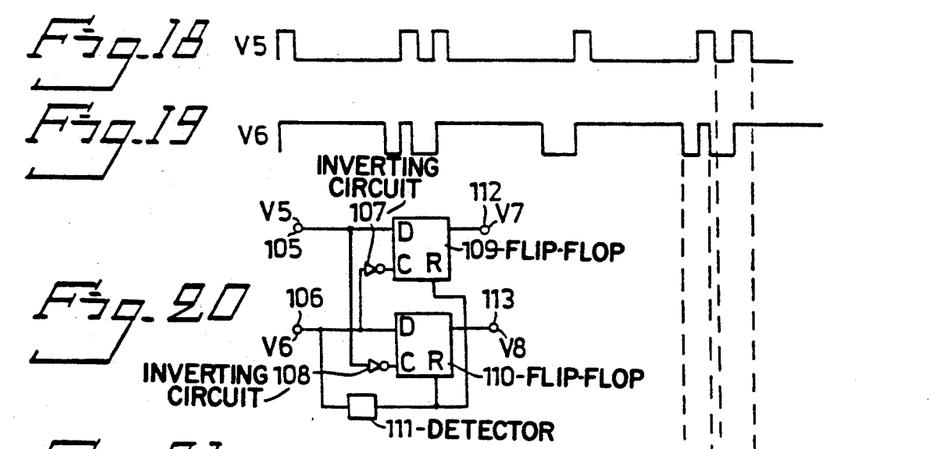
FIGS. 18 and 19 illustrate signals from the circuit shown in FIG. 17.
FIG. 20 illustrates a further part of a demodulator according to the second embodiment of the invention.

The signals obtained an the two outputs 105,106 in this way, one from the multivibrator and one direct from the detector diode, are exemplified in FIGS. 18 and 19 as V5 and V6 respectively.

As illustrated in FIG. 20, the outputs 105 and 106 are connected to two flip-flop circuits 109,110 of the D-type, such as MC 14013B, on the data input D of respective circuits 109,110. The outputs 105,106 are also applied to the clock input C of respective flip-flop circuits, via a respective inverting circuit 107,108. The clock input C of respective circuits 109,110 triggers on negative flanks in the received original signal.

There is also provided a suitable, known detector 111 for detecting positive flanks in the signal obtained from the output 105 or 106. The detection of positive flanks causes the detector 111 to produce a so-called reset-signal on the reset input R of the two flip-flop circuits, 109,110.

Figures 21, 22:
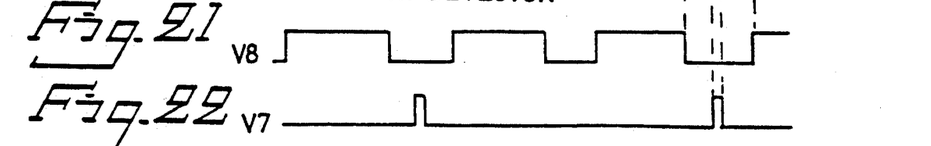
FIGS. 21, 22 illustrate signals from the circuit shown in FIG. 20.

The flip-flop circuits convert the pulse trains V5 and V6 on the outputs 105 and 106 into two signals, a data signal V7, which occurs on the output 112 of the one 109 of said flip-flop circuits, and a clock signal V8 on the output 113 of the other 110 of said flip-flop circuits, the signals V7,V8 being illustrated in FIGS. 22 and 21 respectively.

The flip-flop circuits now function such that in the case of a negative flank in the signal V6, the output 112 of the circuit 109 will present the signal V5, which is the signal V7 in FIG. 22, whereas in the case of a negative flank in the signal V5, the signal V6 will be applied to the output 113 of the circuit 110, this signal being the signal V8 in FIG. 21.

The modulation steps applied to the modulator 3 via the conductors 4,5 have herewith been recreated and separated to provide mutually independent data and clock conductors on the slave side.

Those flanks of the signals FIGS. 18, 19 which cause a signal change to take place in the clock conductor V8 and data conductor V7 respectively, via the flip-flop circuits 109,110, are marked with broken lines between FIGS. 18, 19, 21 and 22.

An alternative method of separating the data and clock conductors, by transmitting the carrier wave over markedly short and long time periods is described in the following.

The interruptions in transmission are now used as information carriers, wherein, for instance, switching or marking of levels in the clock conductor 5 initiate a first modulation step or occurrence, constituting a short transmission interruption, whereas level switching or marking in the data conductor 4 initiates a second modulation step or occurrence, constituting two interruptions in transmission in rapid sequence.

Figure 23:
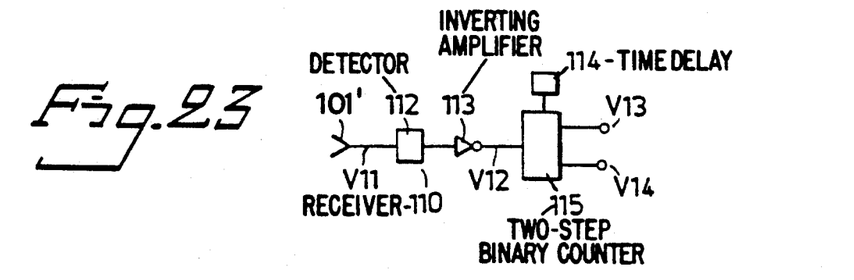
FIG. 23 illustrates an alternative embodiment of a receiver and FIGS. 24a-24d illustrates different signals appearing in the receiver shown in FIG. 23.
Figure 24A:
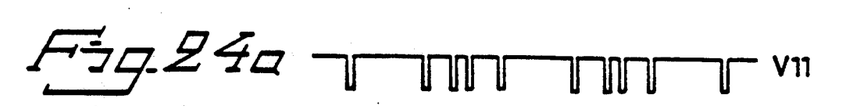
Figure 24B:
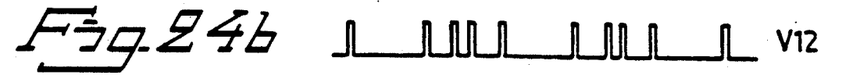
Figures 24C, 24D:
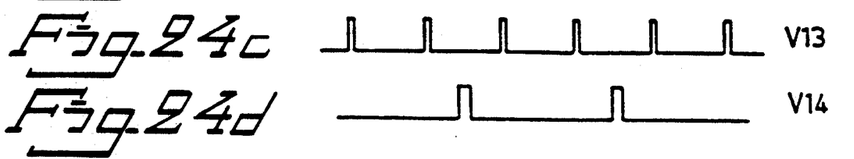

FIG. 23 illustrates the circuits capable of being used to demodulate and separate these modulation steps.

The embodiment illustrated in FIG. 23 includes a receiver 110, comprising an antenna 101', which receives the wave form signal V11 (see FIG. 24), a dectector 112 and an inverting amplifier 113 which provides signal V12. The receiver is connected and passes the inverted wave-form signal V12 to a two-step binary counter 115 to which there is connected a time delay circuit 114 of similar construction to the multivibrator 103 with RC-circuit 104, illustrated in FIG. 17. The time delay circuit 114 decides when the levels on the outputs of the counter are deactivated, and then sets the counter to zero. In this way, the first step V13 of the counter will show the modulation step with a single transmission interruption and the other step V14 will show a modulation step with a double interruption in transmission.

For the purpose of retransmitting data from the "slave" side to the "master" side, there is used a circuit of the kind previously described with reference to FIG.

15, where the point 71 in FIG. 15 is connected to the point 112 in FIG. 20.

In this case, the output 76 can be connected to a modulator, which may be the aforesaid detector diode 102, or to an oscillator connected to the detector diode. The output 76 is herewith able to control the impedance of the detector diode, a carrier wave rereflected from the antenna.

A separate oscillator may also be used for signal retransmission. This oscillator frequency is then modulated by means of a modulator controlled by the signal on the output 76.

According to this further embodiment, the carrier wave is transmitted constantly with short breaks in transmission. Consequently, during the time period which passes between the time at which the RC-circuit output is low, which marks the end of the reference time, to the next flank in the data conductor 4 or the clock conductor 5, an unmodulated carrier wave is transmitted to the modulator 3 from the "master" side to the "slave" side.

This time period is preferably used to retransmit data, as before described.

Since the carrier wave is constantly transmitted, with the exception of the interruptions in transmission, the DC-signal obtained in the receiver subsequent to rectification can be used as an energy source in the receiver. In some applications, it is desirable that entrance to the serial data bus an the "slave" side is controlled by a code. FIG. 16 illustrates schematically a code key circuit arrangement 80 which includes a fixed memory 81 and a shift register 82, and the requisite logic circuits 91,92 of a known kind. The points 83 and 84 are connected along the one conductor and the points 85 and 86 along the other conductor of the serial bus. Located along the one conductor is a first electronic switch 87, while a second electronic switch 88 is located along the other conductor.

A code is stored in the fixed memory.

When desiring access to the serial bus, a pulse train of predetermined configuration is transmitted in either one or both of the two signal channels. The code, in the form of pulse trains in the shift register is fed-in through the conductors 89,90, whereafter the code stored in the shift register 82 is compared with a code in the fixed memory 81.

If the codes coincide, the logic circuits 91,92 will close the electronic switches 87,88, such as to connect the respective points 83,84 and 85,86. It will be evident from the foregoing that in the case of the two described embodiments signals are transmitted via a serial two-conductor data bus in a wireless or non-physical fashion by means of only one transmission device, where a separate data channel and a separate clock signal are regenerated subsequent to transmission.

It will be understood that the present invention can be given other detail solutions than those described in the aforegoing.

The present invention is thus not restricted to the aforedescribed and illustrated embodiments, since modifications and variations can be made within the scope of the following claims.

What is claimed and desired to be secured by Letters Patent is:

1. A single receiver comprising: a demodulator, an output which is a serial, two-conductor data bus and input means to receive a wireless transmission of a modulated carrier signal from a transmitter that uses an oscillator to generate and transmit an alternating carrier signal which has been modulated by independent clock signals and data signals from a serial, two-conductor data bus input which has data signals that have a positive and a negative flank which respectively do not coincide with a positive or negative flank of the clock signals, and the modulated carrier signal, before transmission, having been modulated in dependence on the signal on the input clock conductor and in dependence on the signal on the input data conductor respectively, so that the transmitted carrier signal includes two significant, mutually independent, separate signal channels, which do not coincide in time, the first channel being caused by modulation steps on one of the groups of positive half cycles and negative half cycles of the alternating carrier signal being transmitted and the second channel being caused by modulation steps on the other of the groups of half cycles, and the first channel being for modulations representing data signals from the input data signal conductor and the second channel being for modulations representing clock signals from the input clock signal conductor and wherein the steps of the modulations of the carrier signal representing the clock signals are out-of-phase with the steps of the modulations of the carrier signal representing the data signals; and said receiver demodulator comprising means to demodulate the transmitted modulated, oscillator generated carrier signal received by the single receiver and to recreate independent clock and data signals corresponding to the independent clock and data signals conducted from the input serial, two-conductor data bus to the transmitter, and which do not coincide in time; and further comprising that said demodulator has a clock conductor output for said recreated clock signal and a data conductor output for said recreated data signal, said clock conductor output and said data conductor output being connected to the said output serial two-conductor data bus.

2. A receiver as defined in claim 1, characterised in that wireless receiving of the modulated carrier signal is effected with an inductive transmission device having at least two adjacent coils and where the single receiver includes one of said two coils.

3. A receiver according to claim 1, further comprising: a diode type of rectifying bridge connected to said receiver input means; and said demodulator includes two logic circuits with outputs, of which a first of said logic circuits is connected across a first diode in said rectifying bridge such as to cause said first diode to take out the positive half cycles of the received modulated carrier signal, and of which a second of said logic circuits is connected across a second diode in said rectifying bridge such as to cause said second diode to take out the negative half cycles of the received modulated carrier signal; and further in that said logic circuits are arranged to produce on their respective said outputs, a pulse train corresponding to the positive and the negative half cycles respectively; and wherein the demodulator includes circuits for separating modulated positive half cycles from modulated negative half cycles.

4. A receiver as defined in claim 3, wherein said demodulator includes two single-step counters, said outputs of the two said logic circuits are connected to the inputs of said two single-step counters in a manner such to obtain a first characteristic signal on the output of a first of said single-step counters when a positive half cycle of the carrier signal is modulated, and such as to obtain a second characteristic signal on the output of the other of said single-step counters when a negative half cycle of the carrier signal is modulated.

5. An arrangement according to claim 4, characterised in that said outputs of said logic circuits are connected to a trigger circuit which comprises an OR-gate, a low-pass filter and an inverting circuit, the output of said trigger circuit being connected to two latch-circuits, wherein an input of one of said latch-circuits is connected to the output of the first said single-step counter, and wherein the in input of the other of said latch-circuits is connected to the output of said other single-step counter, and the outputs of the two latch circuits provide the recreated clock and data signals.

6. A single receiver comprising: a demodulator, an output which is a serial, two-conductor data bus and input means to receive a wireless transmission of a modulated carrier signal from a transmitter that uses an oscillator to generate and transmit an alternating carrier signal which has been modulated by independent clock signals and data signals from a serial, two-conductor data bus input which has data signals that have a positive and a negative flank which respectively do not coincide with a positive or negative flank of the clock signals, and the modulated carrier signal, before transmission, having ben modulated in two steps, one step being representative of the signal on the input clock conductor and the other step being representative of the signal on the input data conductor respectively, so that the transmitted carrier signal includes two significant, mutually independent, different and separate modulated steps on the oscillating carrier signal which do not coincide in time, a first of the two different modulation steps being a transmission of the carrier signal over a predetermined short time period and the second of the two different modulation steps being a transmission of the carrier signal over a predetermined long time period, of which periods the short time period is significantly shorter than the duration of a given, predetermined reference time and the long time period is significantly longer than the reference time, and said receiver demodulator comprising means to demodulate the transmitted modulated, oscillator generated carrier signal received by the single receiver and to recreate independent clock and data signals corresponding to the independent clock and data signals conducted from the input serial, two-conductor data bus to the transmitter, and which do not coincide in time; and further comprising that said demodulator has a clock conductor output for said recreated clock signal and a data conductor output for said recreated data signal, said clock conductor output and said data conductor output being connected to the said output serial two-conductor data bus.

7. A receiver as defined in claim 6, wherein the oscillator produced alternating carrier frequency is high in relation to data pulse speed, and said receiver has means which utilizes the carrier frequency as said predetermined reference time.

8. A receiver as defined in claim 6, including a rectifier which receives the modulated carrier signal and recreates the modulations on the carrier signal and wherein said receiver demodulator includes a time comparison circuit constructed to compare the pulse length of the various pulses received with said reference time; and in that said receiver demodulator also includes said data conductor and clock conductor outputs and produces a data conductor signal on a first of said two outputs and produces a clock conductor signal on the other of said two outputs.

9. A receiver according to claim 8, characterised in that said receiver demodulator rectifier is a detector diode and said time comparison circuit includes a multivibrator and an RC-circuit.

10. A receiver as defined in claim 9, wherein said demodulator includes two flip-flop circuits and a detector, the output of said multivibrator and the output of said detector diode are connected, respectively, to the inputs of said two flip-flop circuits, said detector is connected between the output of said detector diode and the inputs of said two flip-flop circuits; said flip-flop circuits being adapted to be triggered by said detector upon detection of flanks in the signal from both of the multivibrator and detector diode outputs; said flip-flop circuits being operative to recreate the clock and data signals which were conducted from the input serial two-conductor data bus to the transmitter, and of which flip-flop circuits, one circuit is operative to produce the recreated data signal and the other circuit is operative to produce the recreated clock signal.

* * * * *

UNITED STATES PATENT AND TRADEMARK OFFICE
CERTIFICATE OF CORRECTION

PATENT NO. : 5,251,235
DATED : October 5, 1993
INVENTOR(S) : BENGT HENOCH

It is certified that error appears in the above-identified patent and that said Letters Patent is hereby corrected as shown below:

ON THE COVER SHEET, in the Title, line 2, cancel the word "IS".

On the cover sheet, item [76] correct the spelling of the street name of the inventor's address to read: --BACKVINDELN--.

Column 1, cancel "IS" from line 2 of the Title.

Column 11, line 25, "ben" should be --been--.

Signed and Sealed this

Twenty-third Day of May, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,251,235
DATED : October 5, 1993
INVENTOR(S) : Bengt Henoch

It is certified that error appears in the above-identified patent and that said Letters Patent is hereby corrected as shown below:

On the COVER PAGE, correct item [22] to read:

[22] PCT Filed: June 14, 1989

On the COVER SHEET, add the following items:

Item [63] filed as PCT/SE89/00332 June 14, 1989.

Signed and Sealed this

Fourteenth Day of November, 1995

*Attest:*

BRUCE LEHMAN

*Attesting Officer*     *Commissioner of Patents and Trademarks*